(12) United States Patent
Alstad et al.

(10) Patent No.: US 11,499,503 B1
(45) Date of Patent: Nov. 15, 2022

(54) TRANSLATING COWL THRUST REVERSER SYSTEM WITH EFFLUX MANAGEMENT

(71) Applicant: HONEYWELL INTERNATIONAL INC., Charlotte, NC (US)

(72) Inventors: Shawn Alstad, Phoenix, AZ (US); Robert L. Hoover, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/409,156

(22) Filed: Aug. 23, 2021

(51) Int. Cl.
 *F02K 1/62* (2006.01)

(52) U.S. Cl.
 CPC ........ *F02K 1/625* (2013.01); *F05D 2220/323* (2013.01)

(58) Field of Classification Search
 CPC ... F02K 1/625; F02K 1/62; F02K 1/70; F02K 1/72; F05D 2240/129
 See application file for complete search history.

(56) References Cited

U.S. PATENT DOCUMENTS

| | | | |
|---|---|---|---|
| 7,959,106 B2 | 6/2011 | Guibert et al. | |
| 8,876,042 B2 | 11/2014 | LaChapelle et al. | |
| 10,113,507 B2 | 10/2018 | Starvoic et al. | |
| 10,539,095 B2 | 1/2020 | Stretton | |
| 10,563,614 B2 | 2/2020 | Smith et al. | |
| 10,648,426 B2 | 5/2020 | Smith et al. | |
| 2004/0079073 A1* | 4/2004 | Ramlaoui | F02K 1/72 60/226.2 |
| 2016/0186689 A1* | 6/2016 | Bartel | F02K 1/64 264/296 |
| 2016/0201602 A1* | 7/2016 | Nakhjavani | F02K 1/72 239/265.19 |
| 2017/0321633 A1* | 11/2017 | Boileau | B64D 27/16 |
| 2018/0045140 A1 | 2/2018 | Bond | |
| 2020/0347801 A1 | 11/2020 | Caruel et al. | |

FOREIGN PATENT DOCUMENTS

EP 3284941 A1 7/2017

\* cited by examiner

*Primary Examiner* — Andrew H Nguyen
(74) *Attorney, Agent, or Firm* — Lorenz & Kopf, LLP

(57) ABSTRACT

A translating cowl thrust reverser system with efflux management includes a support structure, a transcowl, a cowl shield, and a single cascade structure. The transcowl and cowl shield are moveable together between a first position, in which the transcowl abuts the support structure, and a second position, in which an aperture is formed between the transcowl and the support structure. The cowl shield has cowl shield turning vanes. The single cascade structure is disposed within the aperture and includes a forward wall, a curved vane, internal turning vanes, and external turning vanes. In the first position, each cowl shield turning vane is disposed between a different pair of external turning vanes. The cowl shield turning vanes, the internal turning vanes, and the external turning vanes turn the airflow so that it is directed substantially perpendicular to, and vertically outboard relative to, a plane of symmetry.

19 Claims, 7 Drawing Sheets

TRANSLATING COWL THRUST REVERSER SYSTEM WITH EFFLUX MANAGEMENT

TECHNICAL FIELD

The present invention generally relates to thrust reverser systems, and more particularly relates to a translating cowl thrust reverser system with efflux management.

BACKGROUND

When turbine-powered aircraft land, the wheel brakes and the imposed aerodynamic drag loads (e.g., flaps, spoilers, etc.) of the aircraft may not be sufficient to achieve the desired stopping distance, therefore, most turbine-powered aircraft include thrust reversers. Turbine-powered aircraft typically include aircraft powered by turbofan engines, turbojet engines, or the like. Thrust reversers enhance the stopping power of these aircraft by redirecting the turbine engine exhaust airflow in order to generate reverse thrust. When stowed, the thrust reverser typically forms a portion of the engine nacelle and forward thrust nozzle. When deployed, the thrust reverser typically redirects at least a portion of the airflow (from the engine fan and/or core exhaust) forward and radially outward, through one or more cascade vanes, to help decelerate the aircraft.

More recently, in an effort to meet the demand for thrust reversers with reduced weight and reduced manufacturing cost, a thrust reverser system with a single cascade vane has been developed. While generally effective, current single cascade thrust reversers do not control the efflux (e.g., engine exhaust air plumes) from a deployed thrust reverser. For several reasons, it is desirable to control the efflux. For example, hot gas impingement on the empennage can blister or ruin the aircraft paint. The efflux could also get injected into the aircraft auxiliary power unit (APU), could result in passengers breathing the engine exhaust gases. If the efflux is only controlled on the aircraft side of the engine, this can adversely impact single engine landing/yaw control. Controlling the efflux can also help ensure sufficient nose down weight on the aircraft for controllability.

Hence, there is a need for a thrust reverser design capable of meeting performance requirements while controlling the efflux therefrom when in the deployed position. The provided thrust reverser system meets at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a translating cowl thrust reverser system with efflux management includes a support structure, a transcowl, a cowl shield, and a single cascade structure. The support structure is adapted to be coupled to an aircraft propulsion engine. The transcowl comprises a front edge and is movable between a first position, in which the front edge abuts the support structure, and a second position, in which an aperture is formed between the front edge and the support structure. The cowl shield is mounted on the support structure and is coupled to, and moveable with, the transcowl between the first position and the second position. The cowl shield comprises a front end and has a plurality of spaced apart cowl shield turning vanes extending from the front end of the cowl shield in a forward direction. The single cascade structure is disposed within the aperture and includes a forward wall, a curved vane, a plurality of internal turning vanes, and a plurality of external turning vanes. The forward wall is coupled to the support structure. The curved vane is spaced apart from, and is disposed aft of, the forward wall to define an airflow gap therebetween. The curved vane has a curved vane inner surface and a curved vane outer surface, and the curved vane inner surface faces the forward wall. The internal turning vanes are disposed within the airflow gap and are spaced apart from each other. Each internal turning vane is coupled to, and extends between, the forward wall and the curved vane inner surface. The external turning vanes are spaced apart from each other, and each external turning vane is coupled to, and extends aft from, the curved vane outer surface. In the first position, each cowl shield turning vane is disposed between a different pair of external turning vanes.

In another embodiment, a translating cowl thrust reverser system with efflux management includes a support structure, a transcowl, a cowl shield, and a single cascade structure. The support structure is adapted to be coupled to an aircraft propulsion engine. The transcowl comprises a front edge and is movable between a first position, in which the front edge abuts the support structure, and a second position, in which an aperture is formed between the front edge and the support structure. The cowl shield is mounted on the support structure and is coupled to, and moveable with, the transcowl between the first position and the second position. The cowl shield comprises a front end and has a plurality of spaced apart cowl shield turning vanes extending from the front end of the cowl shield in a forward direction. The single cascade structure is disposed within the aperture and includes a forward wall, a curved vane, a plurality of internal turning vanes, and a plurality of external turning vanes. The forward wall is coupled to the support structure. The curved vane is spaced apart from, and is disposed aft of, the forward wall to define an airflow gap therebetween. The curved vane has a curved vane inner surface and a curved vane outer surface, and the curved vane inner surface faces the forward wall. The internal turning vanes are disposed within the airflow gap and are spaced apart from each other. Each internal turning vane is coupled to, and extends between, the forward wall and the curved vane inner surface. The external turning vanes are spaced apart from each other, and each external turning vane is coupled to, and extends aft from, the curved vane outer surface. A plane of symmetry extends symmetrically through the support structure and along the axis symmetry, and the cowl shield turning vanes, the internal turning vanes, and the external turning vanes are configured such that, when the transcowl is in the second position, airflow is turned as it passes through the aperture and is directed substantially perpendicular to, and vertically outboard relative to, the plane of symmetry.

Furthermore, other desirable features and characteristics of the thrust reverser system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
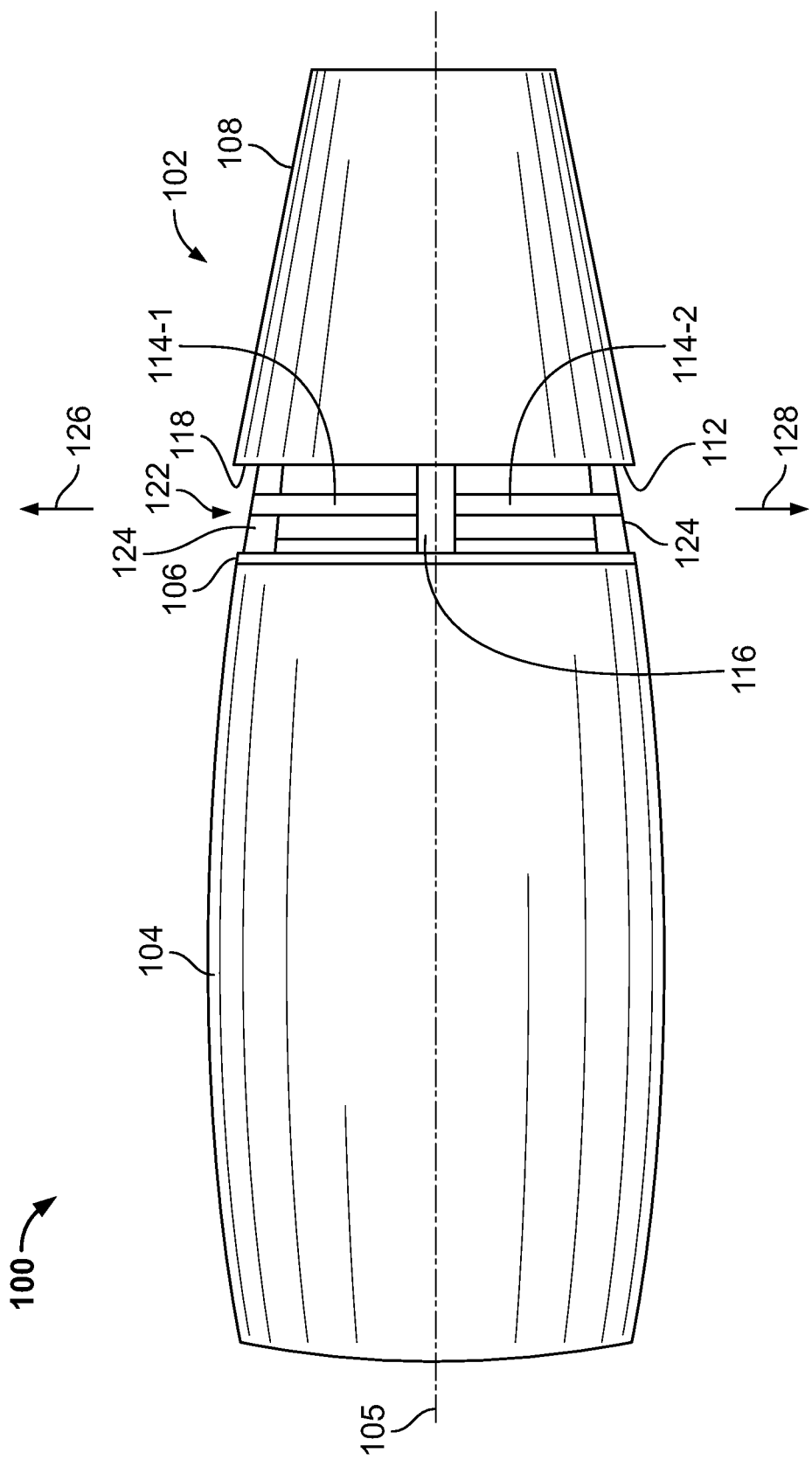
FIG. 1 depicts a side view of an aircraft propulsion engine with one embodiment of a thrust reverser system in a deployed position.

Referring now to FIG. 1, a side view of an aircraft propulsion engine 100 with one embodiment of a thrust reverser system 102 coupled thereto and in a deployed position is depicted. As is generally known, the aircraft propulsion engine 100 includes a turbofan gas turbine engine (not shown) that is encased within an aerodynamically smooth outer covering (the nacelle) 104. The turbofan gas turbine engine, as is also generally known, is a component of an aircraft's propulsion system that typically generates thrust by means of an accelerating mass of gas.

The thrust reverser system 102 is coupled to the aircraft propulsion engine 100 and includes a stationary support structure 106 and an annular translatable cowl, or transcowl 108, and is thus typically referred to as a translating cowl thrust reverser system. The translating cowl thrust reverser system 102, when in a stowed position (not depicted in FIG. 1), forms a portion of the engine nacelle 104 and forward thrust nozzle. When deployed, the thrust reverser redirects at least a portion of the airflow (from the engine fan and/or core exhaust) forward and radially outward, to help decelerate the aircraft.

The translating cowl thrust reverser system 102 includes the support structure 106, the transcowl 108, a cowl shield 112 (not visible in FIG. 1), and at least one single cascade structure 114. The support structure 106 is coupled to the aircraft propulsion engine 100 and, at least in the depicted embodiment, includes one or more side beams 116 extending aft therefrom. The support structure 106 and associated side beams 116 provide a rigid annular support structure to which the at least one single cascade structure 114, cowl shield 112, and transcowl 108 may be mounted.

The transcowl 108 includes a front edge 118 and is movable between a first (or stowed) position and a second (or deployed position). In the first position, which is not depicted in FIG. 1, the front edge 118 abuts the support structure 106. In the second position, which is the position depicted in FIG. 1, an aperture 122 is formed between the front edge 118 and the support structure 106. The aperture 122, as is generally understood, extends substantially circumferentially around a centerline, or rotational axis 105, of the turbofan gas turbine engine.

The cowl shield 112 is movably mounted on the support structure 106, and more specifically on the side beams 116. The cowl shield 112 is also coupled to, and is thus moveable with, the transcowl 108 between the first position and the second position.

The translating cowl thrust reverser system 102, as noted above, includes at least one single cascade structure 114. In the depicted embodiment, the system 102 includes two single cascade structures 114, an upper cascade structure 114-1 and a lower cascade structure 114-1. It will be appreciated, however, that the system 102 could be implemented with only one single cascade structure 114, or three or more cascade structures 114. Regardless of the number, each single cascade structure 114 is coupled to the support structure 106 and disposed within the aperture 122.

Figure 7:
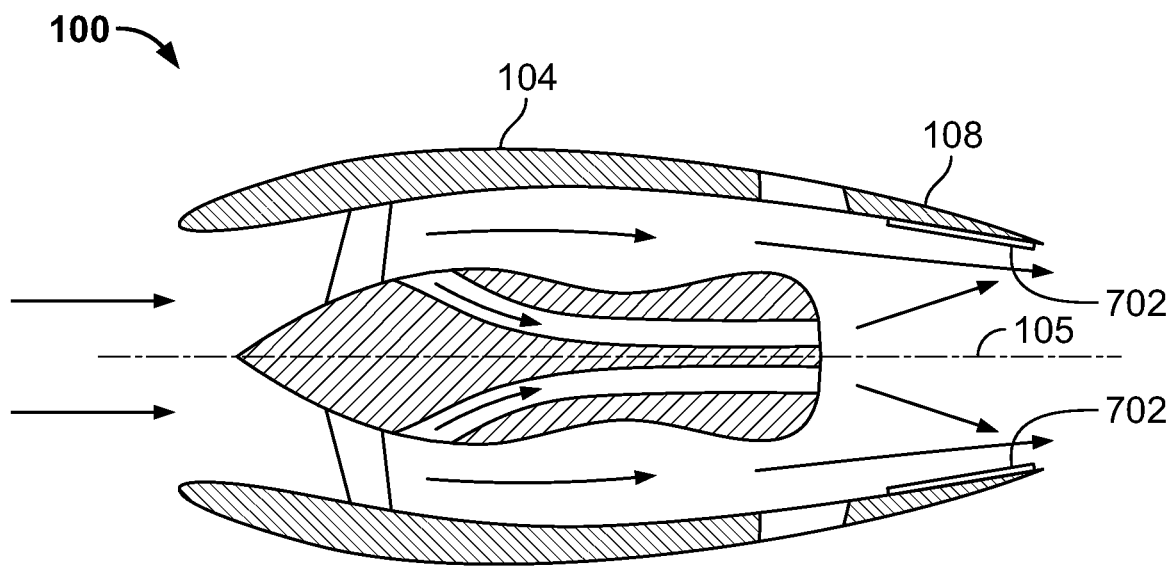
FIGS. 7 and 8 depict, in simplified manner, the thrust reverser system of FIG. 1 in stowed and deployed positions, respectively.
Figure 8:
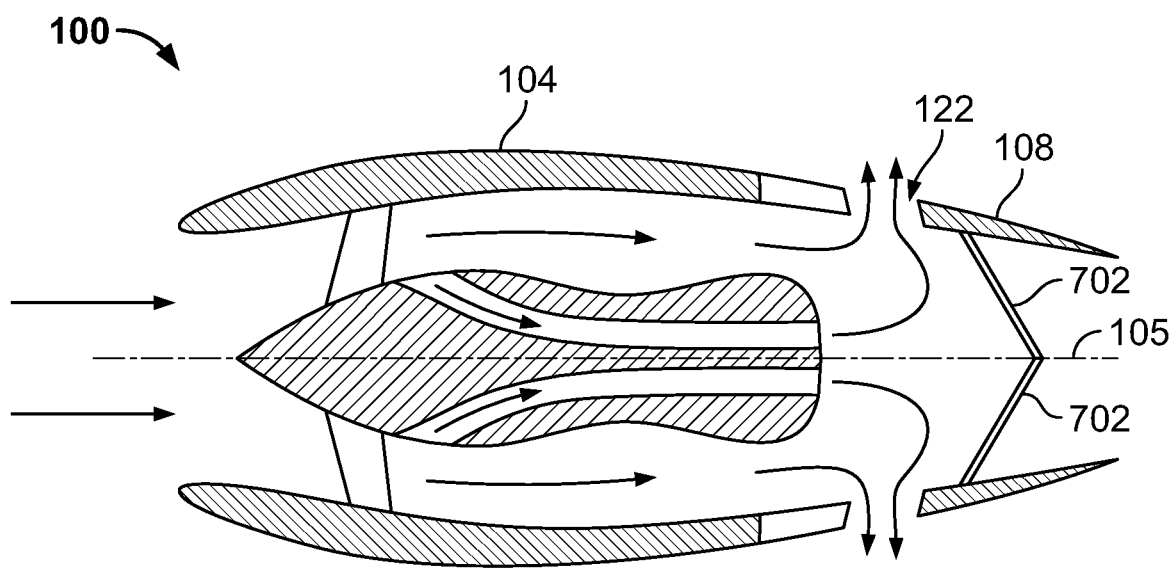

Before proceeding further, it is noted that, although not the focus of the present disclosure, a blocking assembly, such as the one depicted in simplified manner in FIGS. 7 and 8, is generally mounted within the transcowl 108 and performs a blocking function for the engine exhaust flow, thereby redirecting it (directing it forward and radially). The blocking assembly includes one or more blocker doors 702 that move concurrent with the transcowl 108 and cowl shield 112, such that, when the transcowl 108 and cowl shield 112 are moved from the first (or stowed) position (FIG. 7) to the second (or deployed) position (FIG. 8), the blocker doors 702 blocks the exhaust flow and turns the flow forward to discharge through the aperture 122, thereby generating reverse thrust. This re-direction of engine exhaust flow works to slow the aircraft. In practice, the blocking assembly often comprises the displaceable blocker doors 702 and associated mounting and actuation hardware and software. A variety of different mechanisms may be used to couple the displaceable blocker doors 702 to the transcowl 108 such that these components stow and deploy in tandem. These mechanisms could range from a single connecting link to a complex kinematic linkage system. In any of the possible combinations, this linkage system is what transfers the linear transcowl motion into a blocking function, such as, by rotary (pivoting) internal door motion.

Returning now to FIG. 1, it is seen that one or more actuators 124 (two depicted), or other type of movable thrust reverser component causes, are used to move the transcowl 108 between the first and second positions. The actuator(s) 124 may be mounted to the support structure 106 and coupled to the transcowl 108 and/or the cowl shield 112. When the actuator(s) 124 extend(s), it (they) cause(s) the cowl shield 112 and the transcowl 108, to translate from the first (stowed) position to the second (deployed) position. When the actuator(s) 124 retract(s) from the extended position, it (they) return(s) the cowl shield 112 and the transcowl 108, from the second (deployed) position to the first (stowed) position. It will be appreciated that the actuator(s) 124 may comprise mechanical and/or electrical components and may be responsive to aircraft engine system commands. Accordingly, as described further below, embodiments of the single cascade structure(s) 114 and the cowl shield 112 may include features for accommodating the actuator(s) 124.

The translating cowl thrust reverser system 102 depicted herein is configured to provide efflux management. That is, when the transcowl 108 is in the deployed position, air is redirected out the aperture 122 in substantially vertical directions 126, 128 away from the adjacent aircraft fuselage and empennage (not shown). The configuration that implements this efflux management will now be described.

Figure 2:
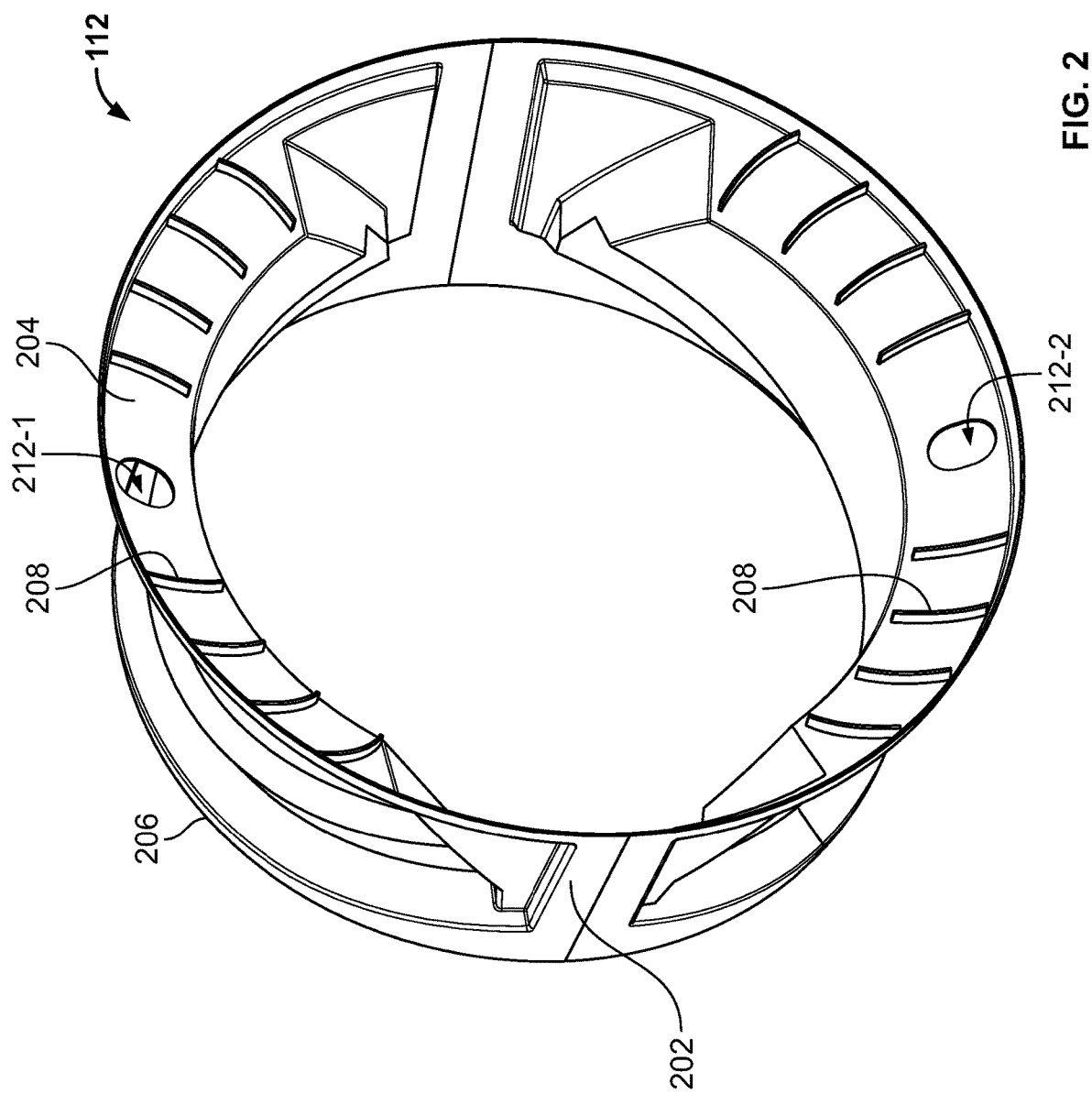
FIG. 2 depicts a plan view of one embodiment of a cowl shield that may be used to implement the thrust reverser system of FIG. 1.

The cowl shield 112, an embodiment of which is depicted in FIG. 2, includes a main body 202 having a front end 204 and a rear end 206. The main body 202, when installed, is movably mounted on the support structure 106 (and more specifically the side beams 116) and, as noted above, moves with the transcowl 108. The cowl shield 112 additionally includes a plurality of spaced apart cowl shield turning vanes 208. Each cowl shield turning vane 208 extends from the front end 204 of the cowl shield 112 in a forward direction (from the perspective of being installed in the engine 100). Although the depicted embodiment includes sixteen cowl shield turning vanes 208, it will be appreciated that the cowl shield 112 could be implemented with more or less than this number of cowl shield turning vanes 208. No matter the specific number of cowl shield turning vanes 208 that are included, each cowl shield turning vane 208 extends a first predetermined distance from the front end 204 of the cowl shield 112. Although the first predetermined distance may vary, it is preferably within a range of 0.5-inches to 2.0-inches.

Figure 3:
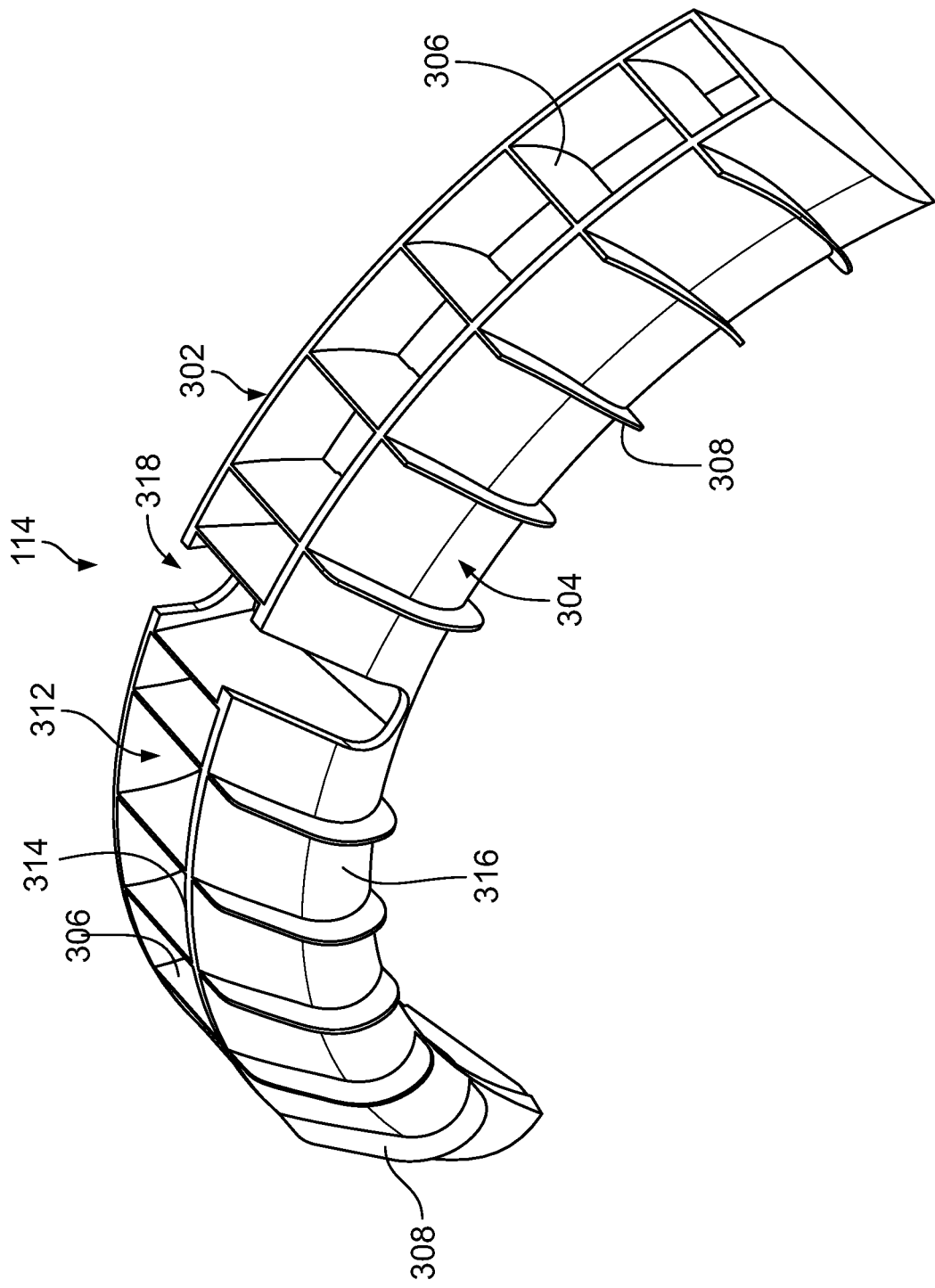
FIG. 3 depicts a plan view of one embodiment of a single cascade that may be used to implement the thrust reverser system of FIG. 1.

Turning now to FIG. 3, an embodiment of one of the single cascade structures 114 is depicted and includes a forward wall 302, a curved vane 304, a plurality of internal turning vanes 306, and a plurality of external turning vanes 308. The forward wall 302, when installed, is coupled to the support structure 106. The curved vane 304 is spaced apart from, and is disposed aft of (from the perspective of being installed in the engine 100), the forward wall 302. Thus, an airflow gap 312 is defined between the forward wall 302 and the curved vane 304. As FIG. 3 also depicts, the curved vane 304 has a curved vane inner surface 314, which faces the forward wall 302, and a curved vane outer surface 316.

The internal turning vanes 306 are disposed within the airflow gap 312 and are spaced apart from each other. Each internal turning vane 306 is also coupled to, and extends between, the forward wall 302 and the curved vane inner surface 314. The external turning vanes 308 are also spaced apart from each other; however, each external turning vane 308 is coupled to, and extends aft from, the curved vane outer surface 316. Although in the depicted embodiment each single cascade structure includes ten internal turning vanes 306 and ten external turning vanes 308, it will be appreciated that each single cascade structure 114 could be implemented with more or less than this number of internal turning vanes 306 and external turning vanes 308. No matter the specific number of internal and external turbine vanes 306, 308 that are included, each external turning vane 308 extends aft a second predetermined distance from the curved vane outer surface 316. Although the second predetermined distance may vary, it is preferably equal to the first predetermined distance, and is thus preferably within a range of 0.5-inches to 2.0-inches.

As FIGS. 2 and 3 also depict, the cowl shield 112 and the single cascade structure 114 each have one or more actuator openings formed therein to accommodate the actuator(s) 124. The number of actuator openings, as may be appreciated, may vary depending on the number of actuators 124 included in the thrust reverser system 102. In the depicted embodiment, in which the thrust reverser system 102 includes two actuators 124, the cowl shield includes two first actuator openings 212 (e.g., 212-1, 2-2-1), and each single cascade structure 114 includes one second actuator opening 318. Each of the first actuator openings 212 extends through the front end 204 of the cowl shield 112. The second actuator opening 318 extends through the forward wall 302 and the curved vane 304.

Figure 4:
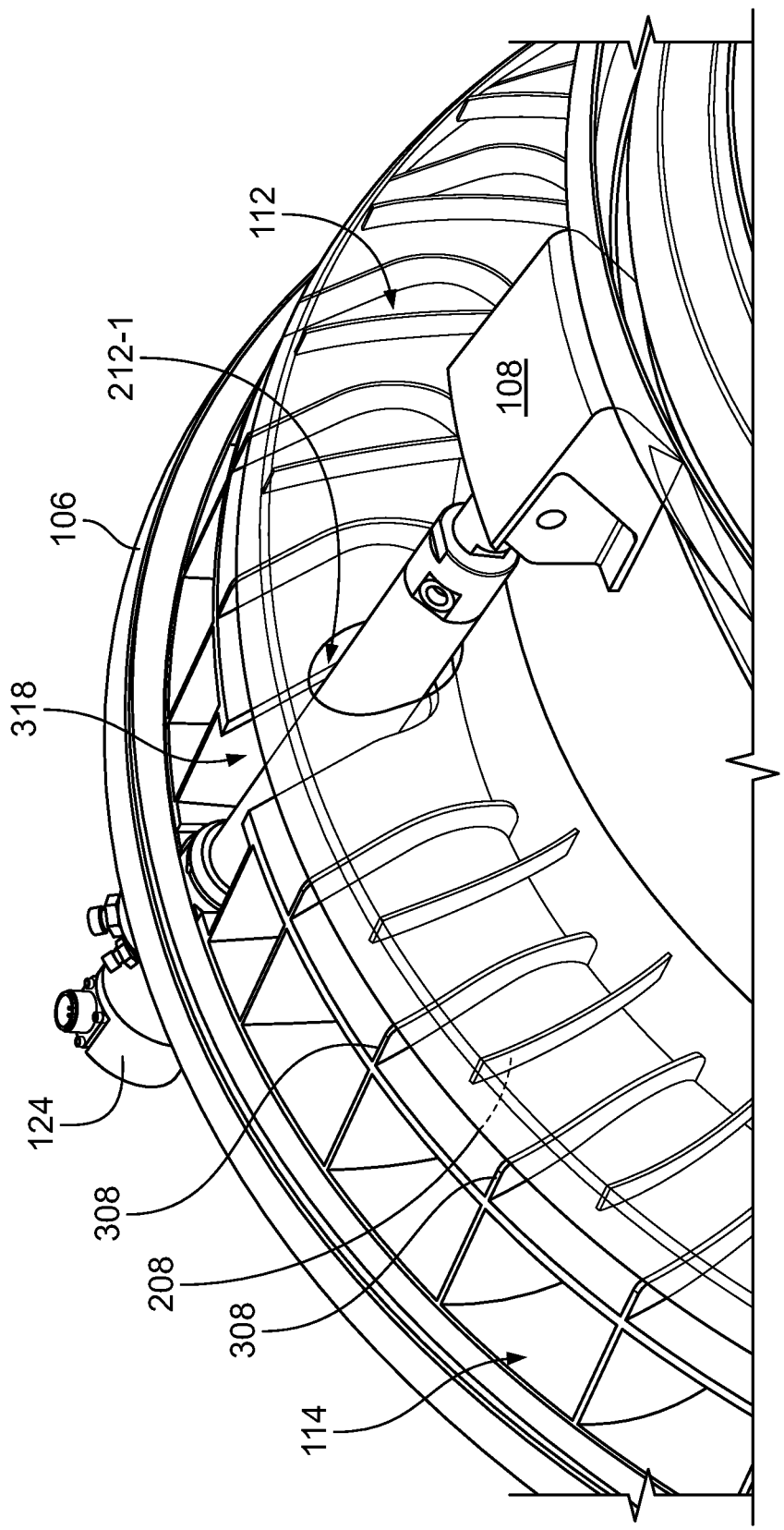
FIG. 4 depicts a portion of a thrust reverser system that includes the cowl shield and cascade structure of FIGS. 2 and 3, respectively, with the thrust reverser in the stowed position.
Figure 5:
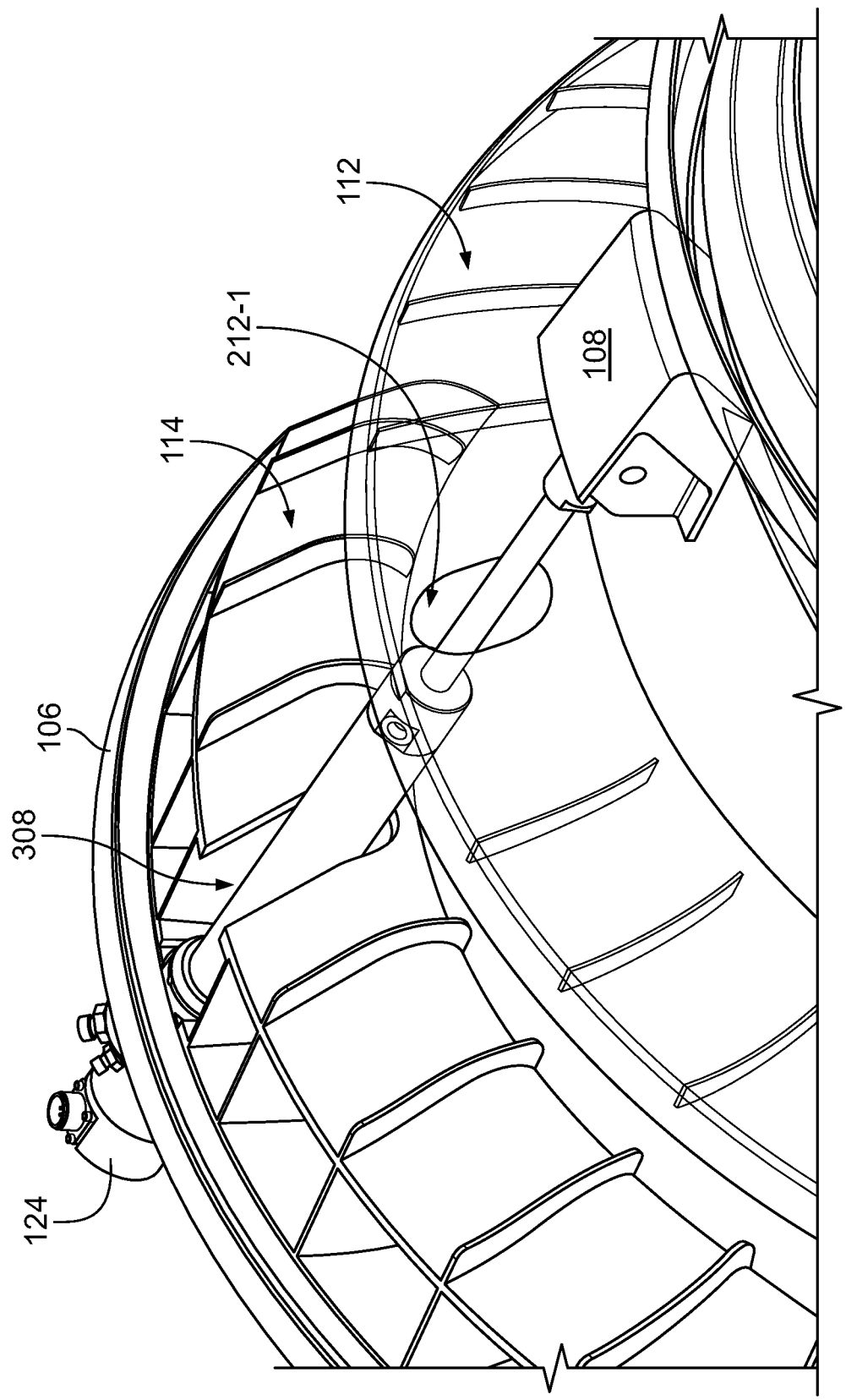
FIG. 5 depicts a portion of a thrust reverser system that includes the cowl shield and cascade structure of FIGS. 2 and 3, respectively, with the thrust reverser in the deployed position.

When assembled, as is shown in FIGS. 4 and 5, each actuator 124 (only one shown) is disposed at least partially within and extends through each second actuator opening 318 and also extends through each first actuator opening 212. The actuator(s) 124, as previously noted, is (are) coupled to the support structure 106 and the transcowl 108 and/or cowl shield 112 and is (are) operable to move the transcowl 108 and cowl shield 112 between the first position (FIG. 4) and the second position (FIG. 5). It is noted that, preferably, at least each second actuator opening 318 is dimensioned to allow airflow around the actuator 124 at least when the transcowl 108 and cowl shield 112 are in the second position. Moreover, as shown most clearly in FIG. 4, when the transcowl 108 (and thus the cowl shield 112) is in the first position, the cowl shield turning vanes 208 and the external turning vanes 308 are nested. That is, each cowl shield turning vane 208 is disposed between a different pair of external turning vanes 308.

Figure 6:
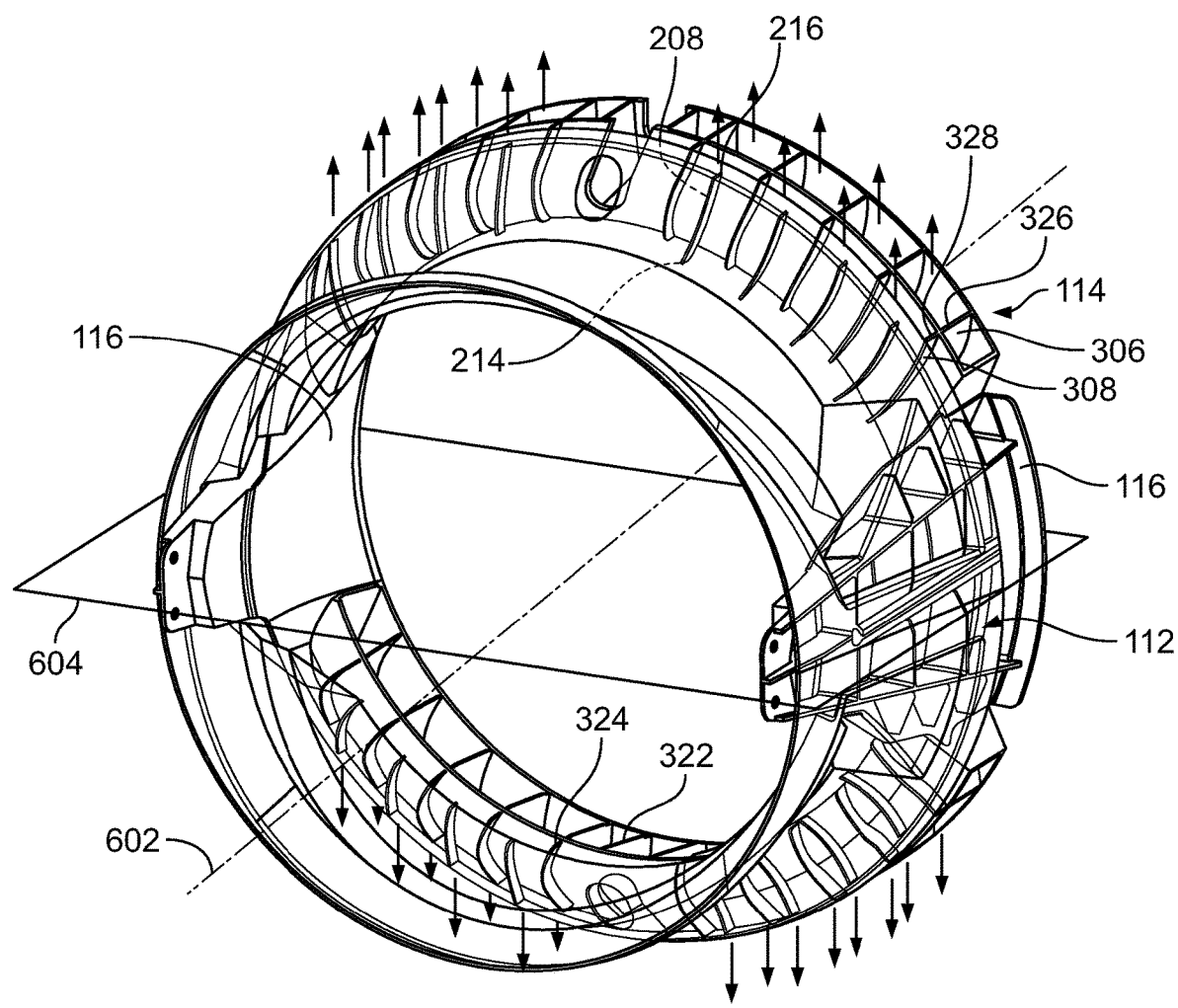
FIG. 6 depicts a portion of a thrust reverser system that includes the cowl shield and cascade structure of FIGS. 2 and 3, respectively, with the thrust reverser in the deployed position and further illustrating the direction of efflux from the thrust reverser system.

With reference now to FIG. 6, it is seen that the transcowl 108 (not visible in FIG. 6), the cowl shield 112, and the single cascade structure(s) 114 are symmetrically disposed about an axis of symmetry 602, and a plane of symmetry 604 extends symmetrically through the support structure 106 and along the axis of symmetry 602. As may be appreciated, the axis of symmetry 602 corresponds to the rotational axis 105 depicted in FIG. 1. As FIG. 6 also depicts, the cowl shield turning vanes 208, the internal turning vanes 306, and the external turning vanes 308 are configured such that, when the transcowl 108 (and thus the cowl shield 112) is in the second position, airflow (depicted using arrows) is turned so that it is directed substantially perpendicular to, and vertically outboard relative to, the plane of symmetry 604 as it passes through the aperture 122.

To accomplish the above functionality, and with and with continued reference to FIG. 6, it is seen that each cowl shield turning vane 208, each internal turning vane 306, and each external turning vane 308 extend between two ends—and inboard end 214, 322, 324 and an outboard end 216, 326, 328. It is further seen that each inboard end 214, 322, 324 is directed toward the axis of symmetry 602, and each outboard end 216, 326, 328 is directed perpendicular to the plane of symmetry 604. Moreover, each cowl shield turning vane 208, each internal turning vane 306, and each external turning vane 308 extends in a curved manner between the inboard end 214, 322, 324 and the outboard end 216, 326, 328.

The thrust reverser system 102 describe herein is capable of meeting performance requirements while simultaneously controlling the efflux when the thrust reverser is deployed.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A translating cowl thrust reverser system with efflux management, comprising:
   a support structure adapted to be coupled to an aircraft propulsion engine;
   a transcowl comprising a front edge and movable between a first position, in which the front edge abuts the support structure, and a second position, in which an aperture is formed between the front edge and the support structure;
   a cowl shield mounted on the support structure and coupled to, and moveable with, the transcowl between the first position and the second position, the cowl shield comprising a front end, the cowl shield having a plurality of spaced apart cowl shield turning vanes extending from the front end of the cowl shield in a forward direction; and
   a single cascade structure disposed within the aperture, the single cascade structure comprising:
   a forward wall coupled to the support structure,
   a curved vane spaced apart from, and disposed aft of, the forward wall to define an airflow gap therebetween, the curved vane having a curved vane inner surface and a curved vane outer surface, the curved vane inner surface facing the forward wall,
   a plurality of internal turning vanes disposed within the airflow gap and spaced apart from each other, each internal turning vane coupled to, and extending between, the forward wall and the curved vane inner surface, and
   a plurality of external turning vanes spaced apart from each other, each external turning vane coupled to, and extending aft from, the curved vane outer surface,
   wherein, in the first position, each cowl shield turning vane is disposed between a different pair of the external turning vanes, and wherein, in the second position, each cowl shield turning vane is axially spaced apart from the external turning vanes.

2. The system of claim 1, wherein:
   the transcowl, the cowl shield, and the single cascade structure are symmetrically disposed about an axis of symmetry;
   a plane of symmetry extends symmetrically through the support structure and along the axis symmetry;
   the cowl shield turning vanes, the internal turning vanes, and the external turning vanes are configured such that, when the transcowl is in the second position, airflow is turned as it passes through the aperture and is directed substantially perpendicular to, and vertically outboard relative to, the plane of symmetry.

3. The system of claim 2, wherein:
   each cowl shield turning vane, each internal turning vane, and each external turning vane extend between an inboard end and an outboard end;
   each inboard end is directed toward the axis of symmetry; and
   each outboard end is directed perpendicular to the plane of symmetry.

4. The system of claim 3, wherein each cowl shield turning vane, each internal turning vane, and each external turning vane extend in a curved manner between the inboard end and the outboard end.

5. The system of claim 1, further comprising:
   a first actuator opening formed in the cowl shield; and
   a second actuator opening formed in the single cascade structure and extending between the forward wall and the curved vane.

6. The system of claim 5, further comprising:
   an actuator disposed at least partially within the first actuator opening and the second actuator opening and coupled to the support structure and the transcowl, the actuator operable to move the transcowl between the first position and the second position.

7. The system of claim 6, wherein the second actuator opening is dimensioned to allow airflow around the actuator at least when the transcowl is in the second position.

8. The system of claim 1, wherein:
   each cowl shield turning vane extends a first predetermined distance from the front end of the cowl shield; and
   each external turning vane extends aft a second predetermined distance from the curved vane outer surface.

9. The system of claim 8, wherein the first predetermined distance and the second predetermined distance are equal.

10. The system of claim 9, wherein the first predetermined distance and the second predetermined distance are each within a range of 0.5-inches to 2.0-inches.

11. A translating cowl thrust reverser system with efflux management, comprising:
    a support structure to be coupled to an aircraft propulsion engine;
    a transcowl comprising a front edge and movable between a first position, in which the front edge abuts the support structure, and a second position, in which an aperture is formed between the front edge and the support structure;
    a cowl shield mounted on the support structure and coupled to, and moveable with, the transcowl between the first position and the second position, the cowl shield comprising a front end, the cowl shield having a plurality of spaced apart cowl shield turning vanes extending from the front end of the cowl shield in a forward direction; and a single cascade structure disposed within the aperture and symmetrically disposed about an axis of symmetry, the single cascade structure comprising:

a forward wall coupled to the support structure, a curved vane spaced apart from, and disposed aft of, the forward wall to define an airflow gap therebetween, the curved vane having a curved vane inner surface and a curved vane outer surface, the curved vane inner surface facing the forward wall, a plurality of internal turning vanes disposed within the airflow gap and spaced apart from each other, each internal turning vane coupled to, and extending between, the forward wall and the curved vane inner surface, and a plurality of external turning vanes spaced apart from each other, each external turning vane coupled to, and extending aft from, the curved vane outer surface, wherein:

a plane of symmetry extends symmetrically through the support structure and along the axis symmetry; and the cowl shield turning vanes, the internal turning vanes, and the external turning vanes are configured such that, when the transcowl is in the second position, airflow is turned as it passes through the aperture and is directed substantially perpendicular to, and vertically outboard relative to, the plane of symmetry, wherein each cowl shield turning vane, each internal turning vane, and each external turning vane extends between an inboard end and an outboard end; each inboard end is directed toward the axis of symmetry; and each outboard end is directed perpendicular to the plane of symmetry.

12. The system of claim 11, wherein, in the first position, each cowl shield turning vane is disposed between a different pair of the external turning vanes.

13. The system of claim 12, wherein each cowl shield turning vane, each internal turning vane, and each external turning vane extend in a curved manner between the inboard end and the outboard end.

14. The system of claim 11, further comprising:
a first actuator opening formed in the cowl shield; and
a second actuator opening formed in the single cascade structure and extending between the forward wall and the curved vane.

15. The system of claim 14, further comprising:
an actuator disposed at least partially within the first actuator opening and the second actuator opening and coupled to the support structure and the transcowl, the actuator operable to move the transcowl between the first position and the second position.

16. The system of claim 15, wherein the second actuator opening is dimensioned to allow airflow around the actuator at least when the transcowl is in the second position.

17. The system of claim 11, wherein: each cowl shield turning vane extends a first predetermined distance from the front end of the cowl shield; and each external turning vane extends aft a second predetermined distance from the curved vane outer surface.

18. The system of claim 17, wherein the first predetermined distance and the second predetermined distance are equal.

19. The system of claim 18, wherein the first predetermined distance and the second predetermined distance are each within a range of 0.5-inches to 2.0-inches.

* * * * *